Sept. 13, 1949. F. E. ROCKHILL 2,481,618
ATTACHABLE CREEL KIT
Filed Sept. 18, 1946 2 Sheets-Sheet 2
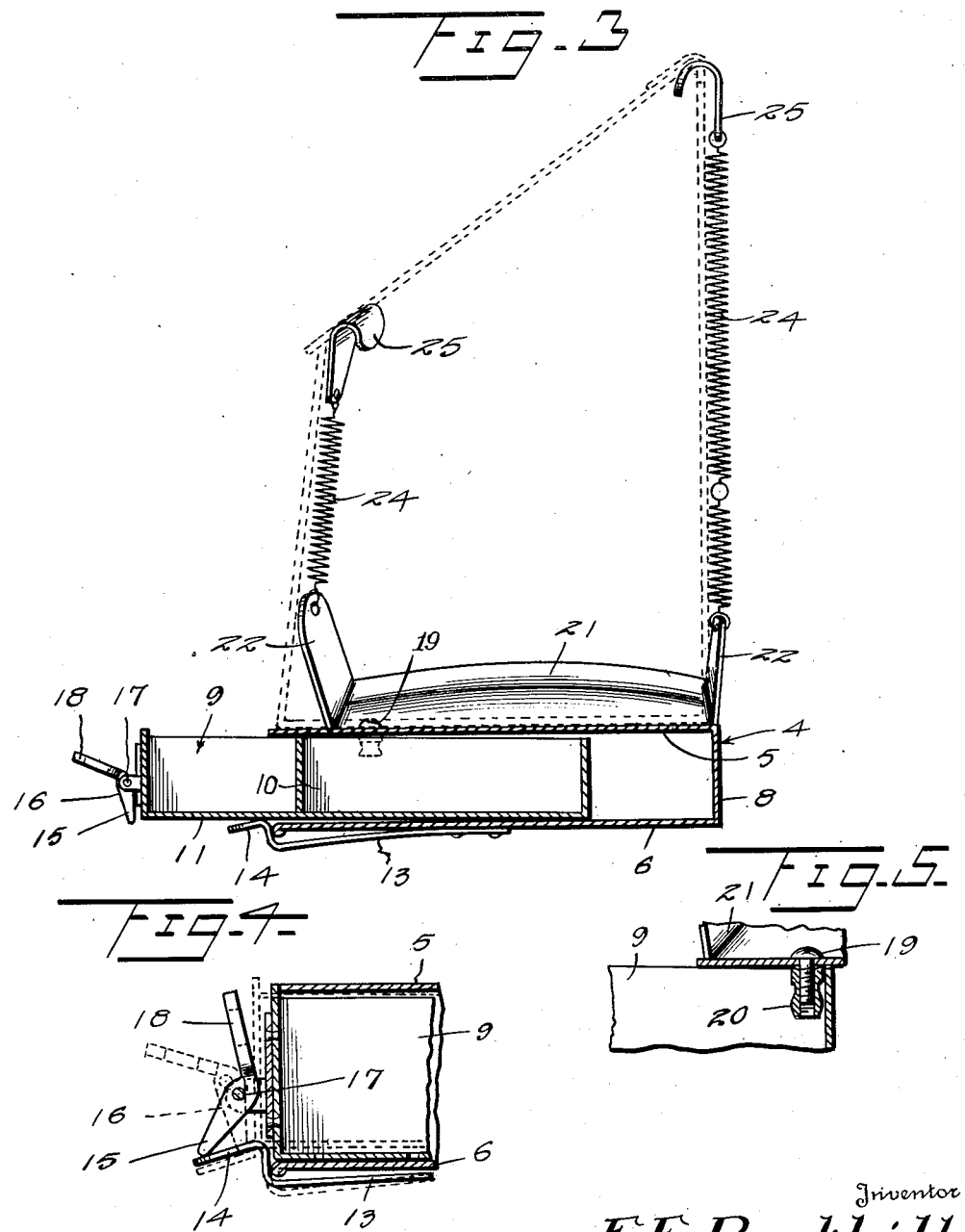

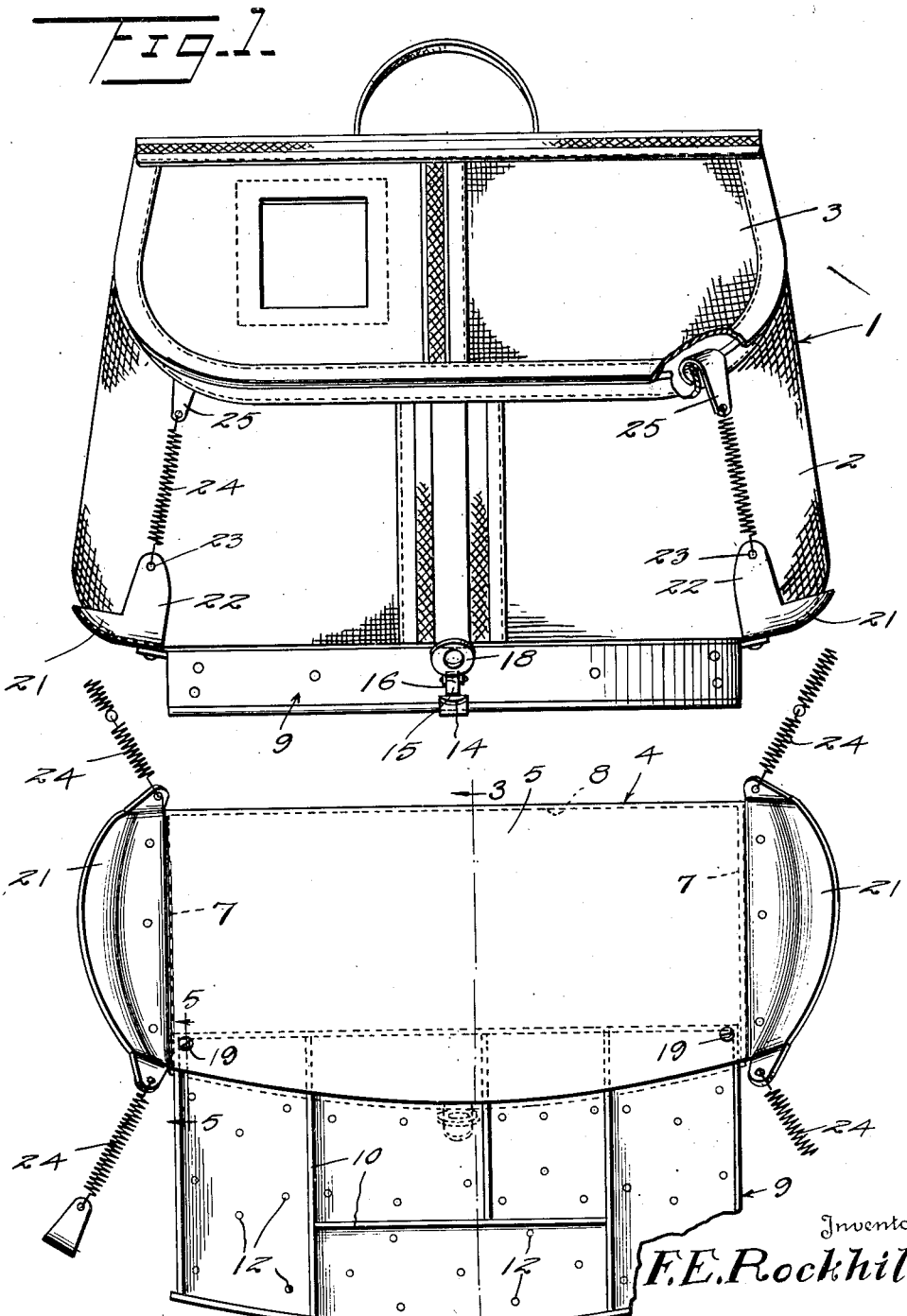

Patented Sept. 13, 1949

2,481,618

UNITED STATES PATENT OFFICE 2,481,618

ATTACHABLE CREEL KIT

Fred E. Rockhill, Aberdeen, Wash.

Application September 18, 1946, Serial No. 697,687

2 Claims. (Cl. 43—31)

1

This invention relates to the class of fishing tackle and pertains particularly to improvements in devices for carrying small articles of the fishing outfit.

The primary object of the present invention is to provide an improved attachment for a fisherman's creel whereby articles which are required for use during the fishing process may be readily and conveniently obtained, and whereby those other articles which are taken off of the line or taken out of use may be easily and quickly stored away.

A further object of the invention is to provide an article carrier which is easily detachably secured to the bottom of a fishing creel, so that it will not interfere in any respect with the use of the creel or with the manipulation by the fisherman of his rod and line, but may be conveniently reached and opened as desired.

Still another object of the invention is to provide an article carrying unit in the nature of a flat casing having a sliding drawer therein with means whereby the casing may be easily secured against the bottom of a fishing creel so that it will not interfere in any way with the setting down of the creel or with the opening and closing of the top of the same.

Still another object of the invention is to provide an improved tackle carrying box, adapted for convenient attachment to the bottom of a creel and having the novel means whereby the drawer forming a part of the box will be securely latched when closed and held in any desired partially opened position and whereby the latching means, when actuated, will not only effect the release of the drawer for opening, but will also start the drawer in its opening movement.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawings:

Figure 1 is a view in front elevation of a fishing creel showing the tackle carrying unit embodying the present invention attached thereto;

Figure 2 is a view in top plan of the tackle carrying unit per se, showing the drawer thereof open;

2

Figure 3 is a vertical transverse sectional view through the tackle carrying unit showing the creel in dotted outline and illustrating the manner in which the catch frictionally holds the partially opened drawer;

Figure 4 is a sectional view through the front part of the unit adjacent the drawer securing latch, showing in detail the manner in which the latch operates to release the drawer and partially open the same; and Figure 5 is a sectional ivew on the line 5—5 of Figure 2.

Referring to the drawings wherein like numerals of reference designate corresponding parts throughout the several views, the numeral 1 generally designates a fishing creel, the body portion of which is indicated by the numeral 2, and the hinged cover or top by the numeral 3.

The tackle carrying unit embodying the present invention comprises a relatively shallow casing 4 having the top wall 5, bottom wall 6, end and back walls 7 and 8, respectively. The front of the casing is open, as shown, and as is also clearly shown in Figure 2, the general contour of the creel, so that when the casing is positioned against the bottom of the creel as it is designed to be placed, the said casing will conform generally to the creel outlines.

Slidably disposed within the casing 4 and movable through the open front thereof is a drawer 9 which is provided with a plurality of dividing partitions 10, which separate the interior of the drawer into a series of compartments for the reception of small articles used in fishing such as hooks, flies, leaders, split shot and other articles which are required by the fisherman to be at hand as he moves along in fishing. The bottom wall 11 of the drawer may be provided with a plurality of apertures 12, as shown, so that the interior of the drawer will be thoroughly ventilated and assist in rapid drying out of the articles placed therein in wet condition.

Secured to the underside of the bottom wall 6 of the drawer casing is the elongated spring latch tongue 13, which has the upwardly and forwardly extending terminal portion 14, which lies across and extends forwardly from the front edge of the casing bottom wall, as clearly illustrated in Figures 3 and 4. This upwardly extended portion of the spring tongue engages against the front wall of the drawer 9, as illustrated in Figure 4, when the drawer is closed and thus prevents the drawer from accidently opening. As is also shown in this figure, the terminal portion extends forwardly and at a downward inclination to provide a camming surface for the nose 15 of the oscillatable latch body 16, which is oscillatably mounted, as indicated at 17, upon the face of the front wall of the drawer. The latch body 16 carries the upwardly extending ring 18 by which it may be conveniently grasped and caused to oscillate so that the nose portion 15 will be forced down against the terminal portion of the tongue 13 and flex it downwardly, as illustrated in dotted lines in Figure 4. By springing the latch spring 13 downwardly, the drawer will be released and the forward oscillation of the ring 18 will simultaneously effect the pulling forwardly of the drawer 9 due to the frictional contact of the nose part 15 with the fixed underlying tongue portion. As shown in Figure 4, this actuation of the latch 18 to release will also start it forwardly so that the bottom 11 of the drawer will come into position over the upwardly extended end of the tongue 13 and thus hold it down so that the drawer can be pulled out. At the same time, however, the upturned forward end of the tongue 13 will exert a constant frictional drag upon the drawer so that it will not slip in or out after it is released even if the device is disposed at an angle.

In order to prevent the drawer being completely drawn out of the casing 4, the top wall 5 is provided at each end and adjacent the forward edge, with the downwardly extending screws or pins 19 which extend into the drawer and which carry sleeves 20 against which the back wall of the drawer abuts when the drawer has been pulled out to its extreme position, as illustrated in Figure 2. Figure 5 illustrates upon an enlarged scale the construction of the drawer stop.

As illustrated in Figure 1, the overall length of the tackle carrying unit is less than the overall length of the creel, and when the device is in position against the bottom of the creel, the portions of the creel bottom lying beyond the ends of the tackle receptacle have engaged thereagainst the dished end wings 21 which are secured in any suitable manner to the ends of the top wall 5 of the casing 4. These wings are dished or have their top surfaces concave so as to conform to the general contour of the bottom of the creel at the ends and corners, as shown in Figure 1, and at the front and rear of each wing 21, an upwardly extending flat arm 22 is disposed, which has an aperture 23 in which is engaged one end of a coil spring 24. The upper end of each of the four springs 24 which are arranged at the four corners of the tackle carrying unit, carry the broad hooks 25 which are designed to engage over the topped edges of the creel walls, as illustrated in Figures 3 and 4. The bills of the hooks at the front of the unit are merely engaged over the top wall of the creel after lifting the cover 3, but the hooks at the back have to be engaged in suitable openings made through, for example, the leather hinge which may attach the creel cover to the back wall of the creel. As will be readily apparent from Figure 3, these springs serve to constantly firmly hold the tackle carrying unit against the bottom of the creel, and because of the dishlike contour of each of the wings 21 and the provision of the upwardly extending flat arms 22, the receptacle beneath the creel will be effectively prevented from shifting or sliding sidewise or forwardly and backwardly so that it substantially becomes an integral part of the creel structure.

It will also be apparent that the present device will not interfere with placing the creel upon the ground, because of the flat character of the receptacle and also the contents of the receptacle are not likely to be lost accidently by the drawer slipping open or shifting its position after it is opened. The tackle carrier may be made of lightweight metal as it will not be subjected to any severe treatment and, therefore, it will not add materially to the weight of the creel.

I claim:

1. A tackle carrying unit for attachment to the bottom of a fishing creel, comprising a flat housing open at one side, a drawer slidably disposed in the housing through said open side, means forming extensions at the ends of the housing for receiving the bottom of the creel at opposite sides of the same, and means carried by said receiving means for coupling the latter across the side walls of the creel with the top edges of said walls.

2. A tackle carrying unit for attachment to a fishing creel, comprising a relatively flat casing having an open side, a drawer mounted in the casing for sliding movement through the open side, latch means for securing said drawer in closed position, a concave wing plate extending from each end of the top of said casing and adapted to receive the bottom of the creel at a corner thereof, a flat arm constituting an upward extension of each plate at the front and at the rear of the casing, spring members connected with the ends of said arms, and a hook carried by each of said spring members for detachable engagement over the top edge of a wall of the creel.

FRED E. ROCKHILL.

REFERENCES CITED

The following references are of record in the file of this patent:

UNITED STATES PATENTS

| Number | Name | Date |
| --- | --- | --- |
| 599,370 | Streator | Feb. 22, 1898 |
| 622,263 | Pritchard et al. | Apr. 4, 1899 |
| 938,293 | Wakefield et al. | Oct. 26, 1909 |
| 1,466,362 | Ginelewitz | Aug. 28, 1923 |
| 1,559,307 | Bernardo | Oct. 27, 1925 |
| 1,876,748 | Rand et al. | Sept. 13, 1932 |
| 1,910,484 | Thompson | May 23, 1933 |
| 2,152,346 | Dickson | Mar. 28, 1939 |